United States Patent [19]
Dion

[11] Patent Number: 5,380,250
[45] Date of Patent: Jan. 10, 1995

[54] FRANGIBLE JOINTS FOR FRANGIBLE BAND OF WIRES OR STRIP OF FASTENERS

[76] Inventor: Jean-Paul Dion, 327 - 21st Street, Québec, Canada, G1L 1Y6

[21] Appl. No.: 24,220

[22] Filed: Mar. 1, 1993

[51] Int. Cl.$^6$ .................. F16B 15/08; B23K 26/00
[52] U.S. Cl. .................... 470/40; 411/443; 219/121.64
[58] Field of Search ............ 470/34, 40; 411/442, 411/443, 444; 219/56, 56.22, 87, 121.63, 121.64, 156

[56] References Cited

U.S. PATENT DOCUMENTS

| | | | |
|---|---|---|---|
| 3,045,588 | 7/1963 | Haubold | 411/442 |
| 3,162,871 | 12/1964 | Powers | 470/34 |
| 3,234,572 | 2/1966 | Roser | 470/40 |
| 4,194,621 | 3/1980 | Lange | 219/57 |
| 4,572,941 | 2/1986 | Sciaky ewt al. | 219/121.64 |
| 4,679,975 | 7/1987 | Leistner | 411/443 |

FOREIGN PATENT DOCUMENTS

| | | | |
|---|---|---|---|
| 2748862 | 5/1979 | Germany | 411/444 |
| 1116245 | 6/1968 | United Kingdom | 411/443 |

*Primary Examiner*—John Sipos
*Assistant Examiner*—Thomas C. Schoeffler
*Attorney, Agent, or Firm*—Pierre Lesperance; Francois Martineau

[57] ABSTRACT

The fastener strips are made from a band of wires which consists of a series of parallel spot-weldable metallic wires disposed side by side, contiguously and spot-welded to each other at longitudinally spaced points of the wires and arranged along lines transverse to the bands. The spot welds are produced by a laser beam swept across the band as the same is continuously moving. The band is thereafter cut and stamped to form fastener strips. The spot welds constitute frangible joints holding the fasteners together for manual handling of the strip but breaking when the fasteners are subjected to a separating force such as when used in a pneumatic nailer.

2 Claims, 3 Drawing Sheets

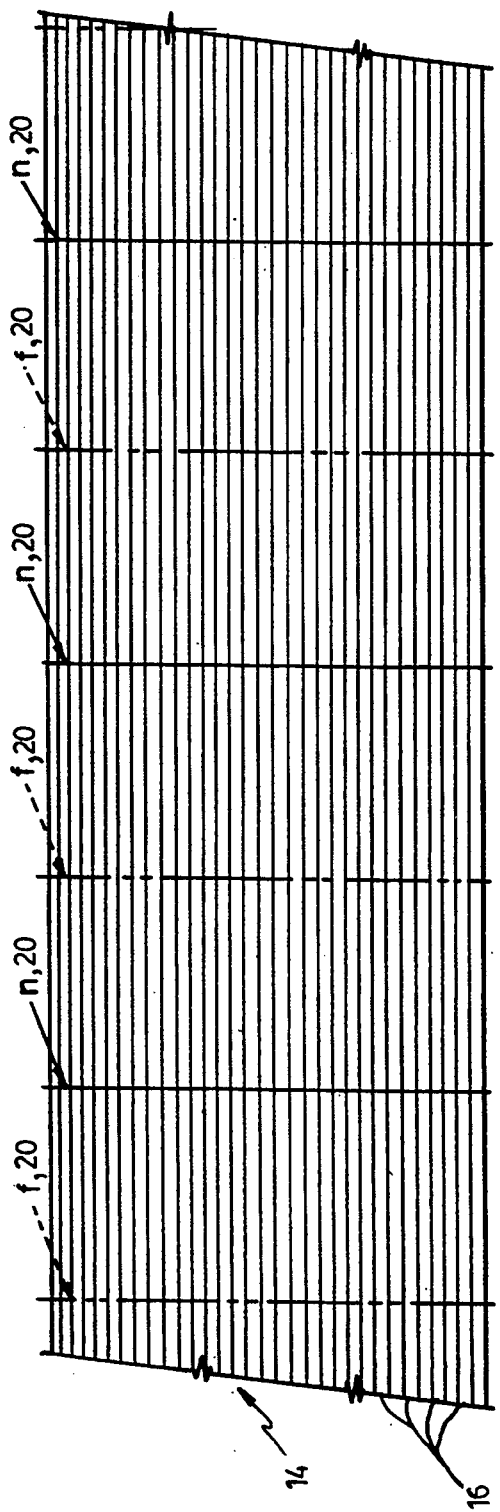
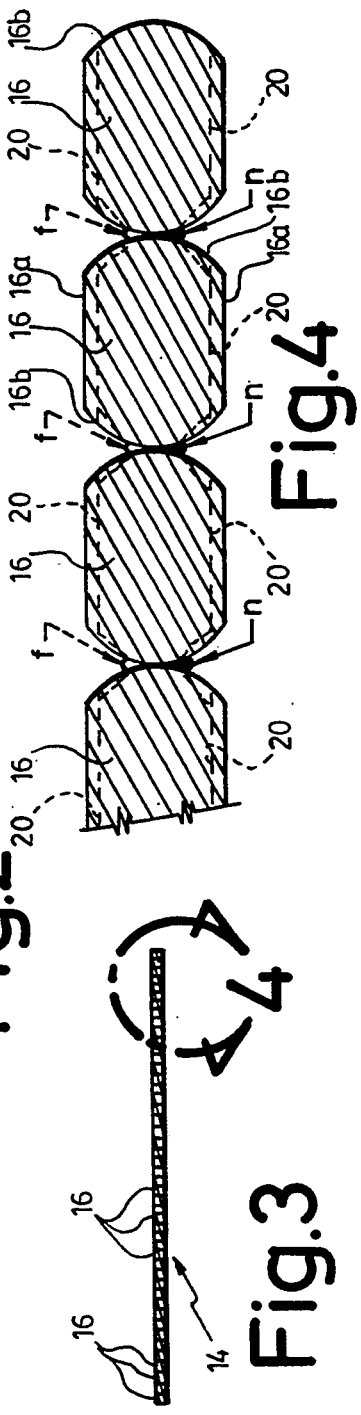
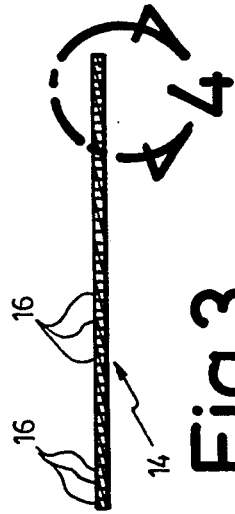
Fig.1
Fig.2
Fig.3
Fig.4

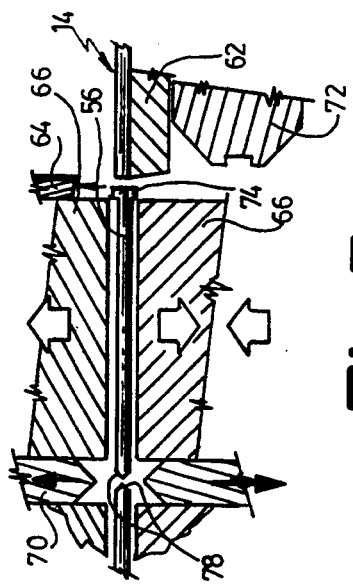
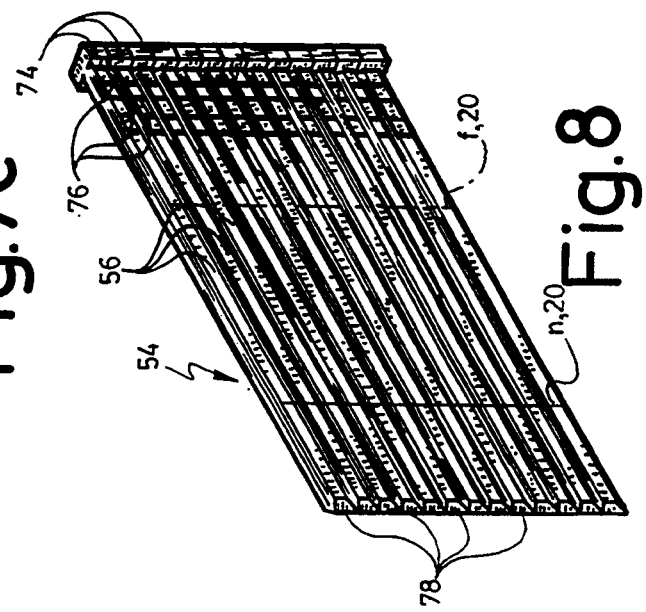
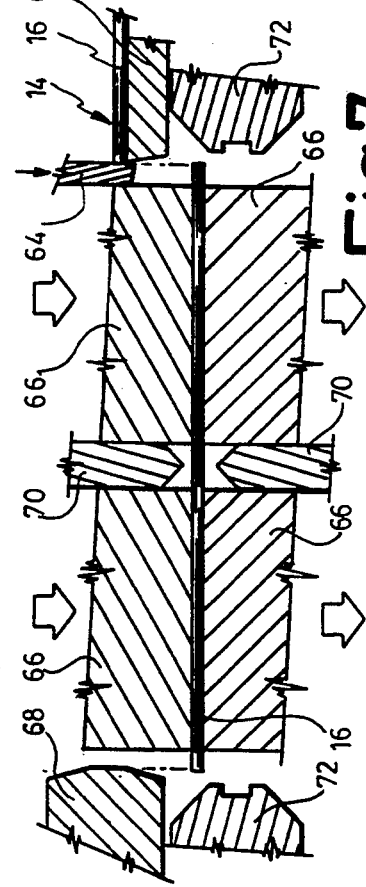
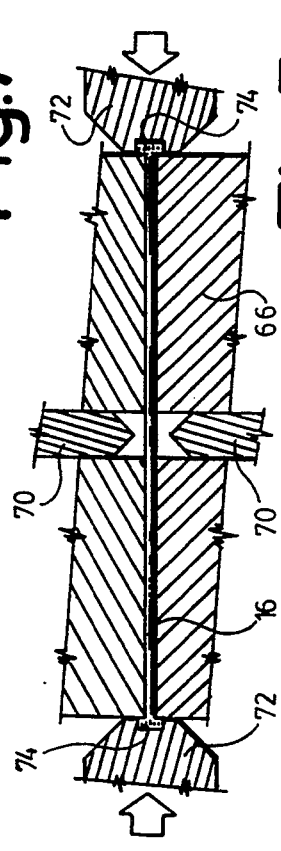
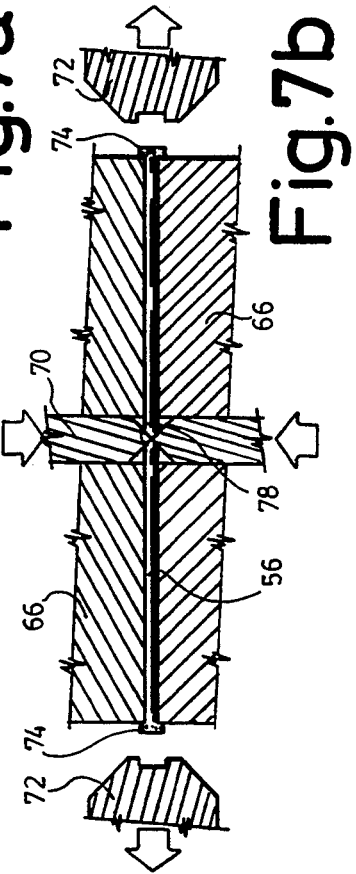

FRANGIBLE JOINTS FOR FRANGIBLE BAND OF WIRES OR STRIP OF FASTENERS

FIELD OF THE INVENTION

This invention relates to bands of interconnected wires, to fastener strips obtained from said bands and to a method of making the bands and the strips.

BACKGROUND OF THE INVENTION

It is known to use a pneumatic fastener driving tools for successively driving nails, cramps or the like fasteners into wood or other material. Such pneumatic fastener driving tools require pre-loading into a magazine a strip of interconnected fasteners. The fasteners of each strip are disposed side by side parallel to each other and are secured to each other by frangible joints. Such joints usually consist of a glue or of an epoxy resin curable by ultraviolet rays such that the fastener strips may be manually handled but the fasteners can be separated when subjected to a separating force. Such a photo-sensitive epoxy cures rapidly but expensive. The solvent evaporation time of the glue is relatively long and this increases the manufacturing time of the fastener strips and therefore their cost.

OBJECT OF THE INVENTION

The main object of the present invention is to provide fastener strips in which the individual fasteners are jointed to each other by frangible joints which are extremely fast to make and are not expensive.

SUMMARY OF THE INVENTION

According to the invention, there is provided a band of wires for conversion into strips of fasteners. The band comprises a series of parallel, spot-weldable metallic wires disposed side by side and contiguously, the contiguous wires being spot-welded to each other at longitudinally spaced points along side wires, the spot welds being disposed along lines transverse to the band, the spot welds produced by a laser beam swept across the band. The resulting spot welds constitute frangible joints holding the wires together as a band for manual handling of the band, but breaking when the wires are subjected to a separating force. The invention is also directed to fastener strips in which the individual fasteners are held together by such spot welds as obtained by a laser beam. The fasteners can be straight nails or U-shaped cramps or the like fasteners. Preferably, the wires constituting the band have a flattened cross-section which flat parallel main faces and convex lateral faces, the adjacent convex lateral faces of contiguous wires being jointed by said spot welds substantially midway of the wire thickness as defined by the distance between the main faces. Preferably, the spot welds disposed along a given line are nearer one main face than the other main face and the spot welds disposed along an adjacent line are farther from said one main face than from the other main face.

The invention is also directed to the method of producing such a band of wires with frangible joints. The contiguous metallic wires are continuously moved along a given path and a laser beam is swept across the moving band in a synchronized manner and the laser beam is divided by beam splitters and mirrors so as to alternately strike one main face and the opposite main face of the band. The invention is also directed to a method and means for converting the laser beam welded wire bands into strips of fasteners.

BRIEF DESCRIPTION OF THE DRAWINGS

FIG. 1 is a plan view of a continuous flat band of metallic wires interconnected by a laser beam produced spot-weld joints;

FIG. 2 is an edge view of the flat band of FIG. 1;

FIG. 3 is a cross-section taken along line 3—3 of FIG. 2;

FIG. 4 is an enlarged view of area 4 in FIG. 3;

FIGS. 7, 7a, 7b and 7c are plan sections of the cutting and stamping machine shown in successive positions for transforming the bands of FIG. 1 into finish nail strips; and FIG. 8 is a perspective view of a nail strip formed by the machine of FIGS. 7 to 7c.

DETAILED DESCRIPTION OF THE INVENTION

Figure 5:
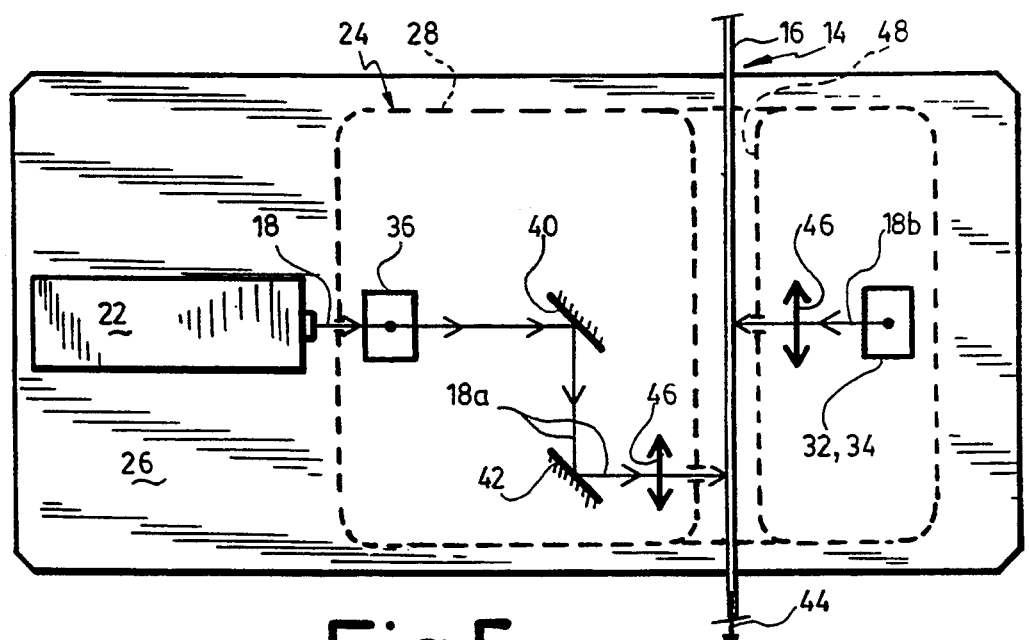
FIGS. 5 and 6 are top and side elevational views, respectively, of the optical bench used for spot-welding the metallic wires to each other into a flat continuous band.

The band of wires 14, illustrated in FIG. 1, consists of a series of straight, contiguous, parallel wires 16 spot-welded along their side edges at weld spots n and f longitudinally spaced along the wires 16 and disposed along straight lines transverse to wires 16. Each wire preferably has a cross-sectional shape shown in FIG. 4 with flat parallel main faces 16a and two opposite outwardly convex lateral faces 16b. The wires are made of a metal which can be spot-welded, preferably steel. The frangible spot-weld joints n and f are located at the junction of faces 16b of contiguous wires 16 alternately nearer one main face 16a and nearer the opposite main face 16a. The joints n and f are produced by a high energy laser beam 18 (FIGS. 5 and 6) which is swept transversely of band 14. The melted metal, upon cooling, hardens and the resulting spot welds anchor the adjacent wires one to another. Beam 18, when swept across the wires may produce a shallow indentation 20 (which is shown in the drawings as being much deeper than in actual practice). These shallow indentations extend transversely of the band in register with the spot welds n and f, respectively. Laser beam 20 is emitted from a laser gun 22 (FIGS. 5 and 6) which is part of an optical bench system 24 which enables one laser gun to generate two different laser beams 18a, 18b, with laser beam 18a striking one main face of band 14, while laser beam 18b strikes orthogonally the opposite main face.

More particularly, optical bench system 24 includes a support 26 on which laser gun 22 and a housing 28 are fixed. System 24 further includes a first beam splitter 30, positioned ahead of the laser gun 22 in the housing 28 and inclined at 45° relative to the axis of the laser beam 18 that originates from the laser gun 22. Beam splitter splits beam 18 into two laser beams 18a, 18b, orthogonal to each other. Laser beam 18b is co-axial with original laser beam 20 and is reflected twice by a set of 45° inclined mirrors 32, 34, located downstream of beam splitter 38, whereby the final leg of laser beam 18b is parallel to, but oriented in a direction opposite that of original beam 18.

Figure 6:
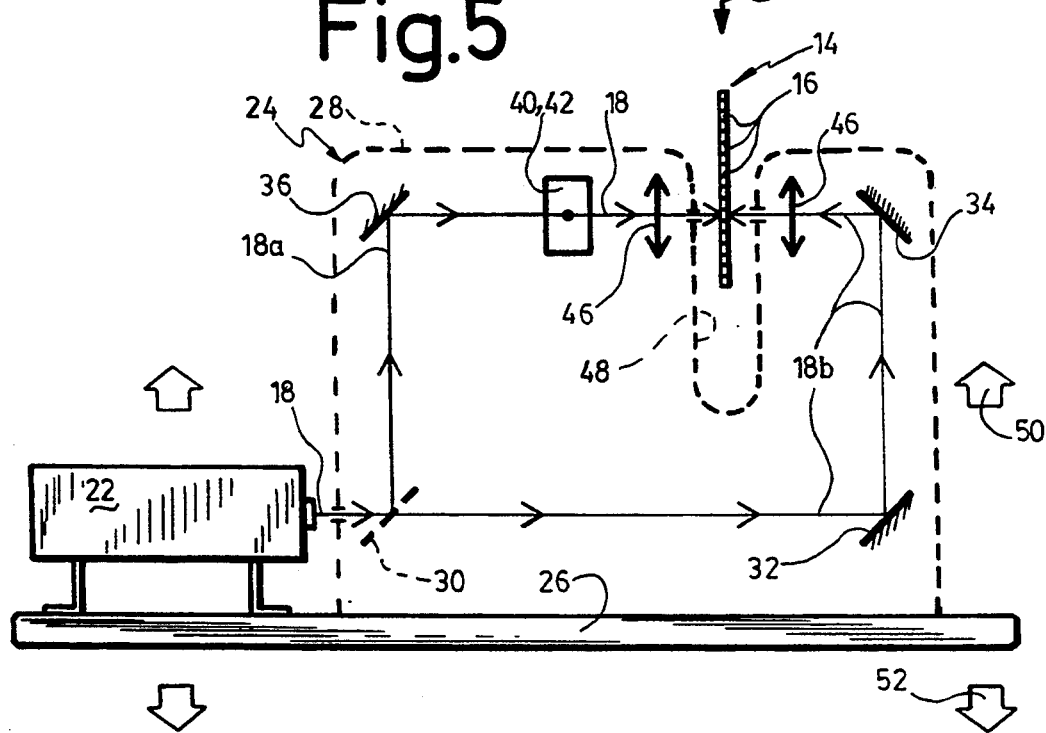

Preferably, and as illustrated in FIG. 6, beam 18 is horizontal, inclined beam splitter 30 and mirror are horizontally aligned, and inclined mirrors 32 and 34 are vertically aligned.

Split laser beam 18a is reflected against vertically inclined mirror 36 and then against horizontally inclined mirrors 40 and 42. The final legs of laser beams 18a and 18b are parallel to each other but in opposite directions and horizontally offset. Each beam 18a, 18b passes through a focusing lens 46 before striking the opposite faces of band 14 which continuously moves through a channel 48 made by housing 28. Band 14 moves horizontally in the direction of arrow 44. The beam splitter 30, mirrors 32, 34, 36, 40 and 42, and lenses 46 are all anchored in their relative position within the housing 28 of the optical bench 24, this housing being shown only as an outline in FIGS. 5 and 6. The housing 28, including the laser gun 22 and their common support 26 are movable in a vertical reciprocating movement indicated by arrows 50, 52 by actuator means (not shown). Horizontal movement of band 14, in accordance with arrow 44, is synchronized with the vertical sweeping movement of laser beams 18a, 18b across the moving band so as to obtain the transverse lines of spots n, f, longitudinally spaced of band 14.

FIG. 8 shows a strip 54 of finishing nails 56 obtained from band 14 and held together by two opposite lines of frangible spot welds n and f. Obviously, the number of spot weld lines per strip 54 can be varied. Also, the laser beam 18 could be directed onto only one face of band 14 and precisely focused at the middle plane of wires 16 so as to burn a hole through the contacting zones of the lateral convex faces 16b. The metal solidifies to form a spot weld at said middle plane. Once the loose wires 16 are transversely secured to each other by the frangible weld joints as just described or by the joints n and f on alternating sides of the middle plane of wires 14, the wires can be transformed into finishing nails or brads with a metal cutting and die-stamping machine as illustrated in FIGS. 7 and 8 to finally obtain the finishing nail strips 54 of FIG. 8.

This machine comprises a shear die 62 cooperating with a shear punch 64, four pressure pads 66, a stop 68 disposed opposite shear die 62 and shear punch 64 with respect to the top pair of pressure pads 66, a pair of oppositely movable stamping and cutting punches 70 disposed between the pads 66 of the upper pair and the pads 66 of the lower pair. The machine also comprises a pair of head stamping punches 72 working in collaboration with the pressure pads 66 which then act as anvils.

The band of wires 14 is fed from right to left on shear die 62 until it abuts the stop 68, the pressure pads 66 being then in the open position of FIG. 7c, the shear punch 64 moves laterally to cut the band 14 to the desired length required to make two nails per cut wire 16. The strip of cut wires 16 is then moved laterally in accordance with the four arrows (FIG. 7) by the pressure pads 66 between which the strip of cut wires 16 is sandwiched.

Referring to FIG. 7a, the two head stamping punches 72 move against the pressure pads 66 which then serve as anvils to form nail heads 74 at opposite ends of the cut wires 16. Then, as shown in FIG. 7b, the stamping and cutting punches 70 act on the middle of the cut wires 16 to form the bevelled ends 78 and cut the length of wires 16 in two so as to obtain two nail strips 54.

Obviously, the head stamping punches 72 and the stamping and cutting punches 70 form the heads and cut the bevelled ends of the several nails 56 forming each nail strip 54. The two resulting strips of nails 54 are then allowed to drop from between the pressure pads 66 after the assembly of the pressure pads and nails 56 has laterally returned to the original position of FIG. 7c, and the pressure pads 66 have opened up. The cycle is then repeated.

The pressure pads 66 are also provided with suitable ribs to make the grooves 76 found on the brad nails 56 during the closing movement of the pressure pads 66 from the position of FIG. 7c to FIG. 7. The resulting strips of nails 54 are held by the frangible joints formed by the spot welds at n, f as previously described.

Obviously, instead of making straight finish nails, the machine could be modified to make U-shaped cramps or other similar fasteners held as strips by the frangible joints of the invention.

I claim:

1. A band of wires for conversion into strips of fasteners comprising a series of parallel, spot-weldable, metallic wires, disposed side by side and contiguously, contiguous wires spot welded to each other at longitudinally spaced points along said wires, the spot welds being disposed along lines transverse to said band, the spot welds produced by a laser beam swept across said band, the portions of contiguous wires between said spot welds being free one from the others, the resulting spot welds constituting frangible joints holding said wires together as a band for manual handling of the band but breaking when said wires are subjected to a separating force, wherein each wire has a flattened cross-section with flat, parallel, main faces and convex, lateral faces, the adjacent convex lateral faces of contiguous wires joined by said spot welds substantially midway of the wire thickness as defined by the distance between said main faces and, wherein the spot welds disposed along a given line are nearer one main face than the other main face and the spot welds disposed along an adjacent line are farther from said one main face than from said other main face.

2. A strip of fasteners comprising a series of parallel, spot weldable, metallic, straight shanks disposed side by side and contiguously, said shanks having a pointed end, and an opposite enlarged head disposed along respective straight lines transverse to said series of shanks, contiguous shanks spot welded to each other at longitudinally spaced points along said shanks, the spot welds being disposed along lines transverse to said shanks, the spot welds produced by a laser beam swept across said shanks, the portions of contiguous shanks between said spot welds being free one from the others, the resulting spot welds constituting frangible joints holding said shanks together as a strip, for manual handling of the strip but breaking when said shanks are subjected to a separating force, each shank constituting a fastener, each shank having a flattened cross-section with flat parallel main faces and convex, lateral faces, the adjacent convex, lateral faces of contiguous shanks joined by said spot welds substantially midway of the shank thickness as defined by the distance between said main faces and the spot welds disposed along a given line being nearer one main face than the other main face, the spot welds disposed along an adjacent line being farther from said one main face than from said other main face.

* * * * *